United States Patent Office 3,047,068
Patented July 31, 1962

3,047,068
FLUID-LOSS PREVENTION IN WELL TREATMENT
Alden W. Hanson, Midland, Mich., assignor to The Dow Chemical Company, Midland, Mich., a corporation of Delaware
No Drawing. Filed Feb. 24, 1959, Ser. No. 794,847
3 Claims. (Cl. 166—42)

The invention is concerned with lessening the loss of a fracturing fluid to a formation during hydraulic fracturing by the addition of a fluid-loss preventive to the fracturing fluid.

Valuable fluids, e.g., fresh water, brine, natural gas, and crude oil are contained in the earth's outer shell. They are found in formations comprising porous strata usually confined between substantially impervious strata, for example, bed rock beneath and cap rock above such strata and are often at least partially further confined by non-conforming fault lines of more or less impervious rock. The accumulation of such fluids are frequently referred to as pools, reservoirs, horizons, or intervals.

By drilling or sinking a well through the confining rock, e.g., the cap rock, such valuable fluids become accessible from the earth's surface. Water, crude oil, and natural gas are often found in the same reservoir, usually stratified according to their relative specific gravities. The fluids of the reservoir are sometimes under such high pressure that once the confining rock is penetrated, they gush forth and flow for considerable periods before their own pressure is sufficiently spent to no longer carry the fluids to the earth's surface. Such fluids can usually be further recovered by deep well pumping. Other reservoirs, after being penetrated by a well, must be pumped from the beginning of the production life of the well.

All formations, including those consisting in part of fluid-bearing strata, vary greatly, e.g., in contour and position in relation to other formations, and in composition, arrangement, thickness, and general character of the strata comprising the formation. Seldom is a reservoir of such uniformity that a fluid contained therein will flow out until a point of near exhaustion of the fluid is obtained by merely providing a pressure differential which can be practically applied. Presence of cross beds of low permeability, bleeding away of fluids into remote portions of the same or adjacent formations, and plugging of the pores in original permeable strata to render them substantially impermeable are among the conditions which cause low production or no production long before the fluid in a producing formation has been largely removed.

From attempts to meet the problems raised by lost production from wells penetrating formations which have considerable fluid remaining therein, there has come into extensive use the well treating operations referred to generally as fracturing.

Fracturing comprises creating fissures and channels in a formation penetrated by a well by pumping down the well and into pores and existing openings in the formation a fluid e.g., oil or water, at sufficient pressure to rupture the rock formation in the well. In a successful fracturing operation, new fissures are created which extend between the wellbore and zones theretofore not in communication with the wellbore. A 40 to 60 mesh sand is sometimes added to the fluid to aid in propping open fissures thus produced. Fracturing of formations has application both to those traversed by a single well and to those traversed by a plurality of wells wherein one or more wells are employed as input wells into which a drive fluid, e.g., water or gas is forced, and one or more wells are the producing wells. Fracturing is also employed to enlarge the storage capacity of porous underground formations and cavities employed for the storage of fluids. When attempting to enlarge such storage capacity, the attainment of rupturing pressures without undue loss of fracturing fluid and without increased costs of operations are sought similarly as in fracturing fluid-producing formations.

To obtain best the objectives of the fracturing operation, the fluid injected into the well should be largely retained in a limited zone at or near the base of the wellbore so that there can be developed, rather rapidly without excessive loss of fracturing fluid, pressures sufficiently great to rupture the formation creating extensive fissures and branches radiating therefrom into the formation in zones not theretofore freely yielding their fluids. If the fracturing fluid bleeds off into the formation or flows only into the existing openings in the formation when being injected down the well, it results in high fluid loss. Effective fracturing pressures are difficult or impossible to attain with high fluid loss.

Among attempts to overcome the fluid loss accompanying fracturing, additives known as fluid-loss preventives are admixed with the fracturing fluid. A good additive is intended to plug the pores and existing channels in the formation thereby permitting fracturing pressures to be more readily achieved and thereafter be easily removed from the formation or be rendered ineffective as a plugging agent. A number of such additives now exist, some of which are silica flour, thickening agents, and lignin, the latter of which is injected in an acid medium in which it is substantially insoluble but is rendered subsequently soluble as the acid medium is made basic by fluids of the formation.

Known methods of fracturing employ fluid-loss preventives which are limited to compounds which are largely of a material which prevents them from being employed in brine or potable water-producing formations because of contamination. Fluid-loss preventives now employed are unsuitable for use in formations being used as storage for a number of substances now stored in underground formations. For example, only traces of contamination in brine will render the brine unsuitable for a number of uses, among which are bromine and chlorine production unless purified prior to processing. Furthermore, all fluid-loss preventives now known are products which must be specifically made presenting problems of over- and under-supply, transportation to, and storage at the site of usage when needed.

There is a need for a method of fracturing formations which employs a fluid-loss preventive which is non-contaminating and is a commonplace substance readily manufactured as needed.

The present invention is a method of fracturing an earth formation having a temperature of at least 32° F. traversed by a well which obviates a number of disadvantages of known methods. The invention consists essentially of injecting an admixture of chipped, broken, crushed, shaved, or otherwise fragmented ice in a fracturing fluid down a well and back into a formation at fracturing pressure. A slurry of snow and water is within the purview of the invention and is included under the broader term, ice. The ice may be admixed with fresh water or brine to make a slurry and then employed as such in a fracturing operation; the ice may be added directly to any known oil, water or oil-water emulsion fracturing fluid and employed thus for fracturing. The brine-ice or water-ice slurry may be first prepared and thereafter added to a known oil, water, or oil-water emulsion and employed thus for fracturing.

The effectiveness of the ice in the fracturing fluid stems from the discovery that ice fragments being both elastic under pressure and having the characteristic of assuming the contour of a pore or a small passageway in a surface having a melting point above that of ice, temporarily plug the pore or passageway until the fragments have melted. The pore may be the interfragmental space between ice fragments already deposited to build up a temporary ice bridge in relatively large openings of the formation.

Accordingly, when ice fragments are admixed with a fracturing fluid and injected down a well and into a formation in the practice of the invention, the ice fragments are forced into pores or into passageways and, therefore, plug such pores and passageways and prevent loss of fracturing fluid to the formation. Subsequently, the pressure is released and the well is put back into production and any unmelted ice is flowed out of the well, or as is usually the case, the ice completely melts at the temperature of the formation and is flowed out as water.

As aforesaid, the ice fragments not only temporarily plug pores or passageways in the exposed walls of the formation but they bridge to form a pack, the succeeding ice fragments being forced into the intersticial spaces among preceding ice fragments thereby plugging openings and channels which are considerably larger in cross-section than the cross-section of single ice fragments.

The usual mode of practicing the invention is to prepare the fragments of ice, slurry the ice in water, brine, or an emulsion, adding as much ice to the fracturing liquid as it will carry without rendering it difficult to pump; building up pressure to fracturing pressures as indicated by sudden drops in the readings on a properly-positioned gauge in the fracturing fluid feed line; and thereafter resuming production from the formation or pumping a fluid into the formation for storage purposes as the case may be. In fracturing it is recommended that a series of rises and succeeding more or less sudden drops in pressure be attained which is indicative of a number of fracture-creating ruptures in the formation.

The ice may be fed into the fracturing liquid in a separate water or brine line which leads into the fracturing liquid by any appropriate pipe arrangement. The equipment now widely employed for feeding propping said or for injecting a composition to provide a fluid-permeable barrier to incoming detritus in a well, such as the resin-coated walnut shell slurried in oil described in U.S. Patent 2,823,753, may be employed to supply the ice. It is recommended that the equipment and lines be insulated or lagged to the extent considered necessary and practical to meet the temperature conditions of individual operations. At lower ambient temperatures at the well head, such precautions would serve no useful purpose, whereas at high ambient temperatures the operation would thereby be rendered more economical and effective.

Sand and other propping agents may be employed in the practice of the invention. Acidizing, wherein an acid, usually a 5-25 percent aqueous solution of hydrochloric acid, containing an inhibitor to corrosive attack on metal, is injected into a limestone or dolomite formation for the purpose of attacking and disintegrating the contacted portions of the formation, may be employed in conjunction with fracturing according to the invention. U.S. Patents 2,877,504 describes a method which applies the basic principles of acidizing subterranean formations. Fracturing, in its broadest aspects, is described in U.S. Reissue Patent 23,733.

A number of advantages emanate from the practice of the invention, chief among which are its applicability to fracturing of brine- and salt-bearing formations and the enlargement of existing cavities in a formation for the storage of brine. The ice-water slurry is highly effective in fracturing formations containing brine or salt which has a negative heat of solution, i.e., when such salt dissolves in water it takes in heat as evidenced by a drop in temperature. Among such salts are Epsom salts and sodium salts such as NaCl and $NaNO_3$. When the ice water slurry contacts such salt in the formation, the temperature of the salt solution thus being produced, and consequently the face of the salt beds in contact therewith, drops below the melting point of ice. Therefore, ice fragments subsequently introduced into the formation, while this low temperature prevails, will melt slowly over an appreciable length of time and will serve as effective plugging agents in the porous walls of the formation while the ice is melting. Fracturing pressures are then easily obtained by subsequent pumping of additional amounts of a known fracturing fluid into the formation. To prolong the plugging effect of the ice, it is recommended that the fracturing fluid be maintained at a conveniently low temperature, say not over about 60° or 70° F. and preferably lower. Non-contamination of salt beds and brine wells and the enlargement of porous non-producing formations for the storage of brines and such gases as ammonia are also important advantages of the invention.

Having described the invention, what is claimed and desired to be protected by Letters Patent is:

1. The method of fracturing a subterranean formation traversed by a wellbore and having a natural temperature above 32° F. consisting of injecting a slurry of ice fragments in an aqueous solution down said well and into said formation under pressure at a rate of injection sufficiently high to maintain unmelted ice fragments in the thus injected solution, forcing at least a portion of the unmelted ice fragments against the porous wall of the formation to form plugs in the more readily accessible channels leading from the wellbore into the formation, raising the pressure to effect fracturing of the formation while such plugs are thus forced against the porous wall and into the channels, releasing the pressure, and discontinuting the injection of slurry.

2. The method of fracturing a fluid-bearing porous subterranean formation traversed by a wellbore and having a natural temperature above 32° F., consisting of injecting a slurry of ice fragments in a fracturing liquid into the formation at a pressure sufficient to produce fractures therein, at least a portion of said ice fragments being forced into natural passageways formed by interconnecting pores and into fractures thus produced into which ice fragments are so forced, thereby to serve as a fluid-loss preventive while at least a portion of said ice fragments is melting and sufficient pressure is being maintained on the injected slurry, and thereafter releasing the pressure on said slurry and discontinuing the injection thereof.

3. The method of treating a subterranean formation containing a salt stratum having a natural temperature above 32° F., said salt having a negative heat of solution, consisting of injecting a slurry of ice fragments in water into said stratum to effect a dissolution of salt in contact therewith to produce icewater brine, continuing to inject the slurry of ice fragments and water into said stratum to lower the temperature of the icewater brine being produced so that at least some ice fragments remain therein to plug pores and fissures in the salt stratum, increasing the pressure applied to the ice fragments and water being injected to that necessary to fracture the formation, and thereafter releasing the pressure and permitting the ice to melt.

References Cited in the file of this patent

UNITED STATES PATENTS 2,734,861    Scott et al. _____ Feb. 14, 1956

OTHER REFERENCES

The Textbook of Physical Chemistry, by Glasstone, pub. by D. Van Nostrand Co., Inc. copyrighted 1940, pages 762 and 763.

Petroleum Production Engineering, Development, by Uren, 4th Edition, pub. by McGraw-Hill Book Co., Inc., New York, N.Y., 1956. Page 15 relied upon.